United States Patent [19]
Vornberger et al.

[11] 3,778,079
[45] Dec. 11, 1973

[54] APPARATUS FOR POSITIONING OF VEHICLE SUSPENSION

[75] Inventors: George F. Vornberger; Arden A. Albaugh, both of Cincinnati, Ohio

[73] Assignee: Pullman Incorporated, Chicago, Ill.

[22] Filed: Jan. 7, 1972

[21] Appl. No.: 216,083

[52] U.S. Cl............... 280/80 B, 280/34 A, 292/35, 292/36, 292/148
[51] Int. Cl............................................. B62d 53/06
[58] Field of Search.............. 280/34 R, 34 A, 80 B, 280/81 R, 405 R, 405 A, 407; 292/35, 36, 148, 167

[56] References Cited
UNITED STATES PATENTS

| | | | |
|---|---|---|---|
| 3,372,946 | 3/1968 | Hutchens | 280/80 B X |
| 3,043,605 | 7/1962 | McKay | 280/405 A X |
| 2,900,194 | 8/1959 | De Lay | 280/34 A |
| 3,156,485 | 11/1964 | De Lay | 280/81 R |
| 3,374,010 | 3/1968 | Crockett et al. | 280/81 R X |
| 3,618,969 | 11/1971 | Glassmeyer | 280/80 B |
| 3,502,345 | 3/1970 | Hulverson | 280/34 R X |

Primary Examiner—Kenneth H. Betts
Assistant Examiner—Leslie J. Paperner
Attorney—Hilmond O. Vogel et al.

[57] ABSTRACT

An apparatus for selectively positioning the sliding suspension frame or bogie relative to the trailer underframe including a bogie locking assembly having a handle and linkage operated spring-loaded locking pins for registering with holes in the fixed suspension rails attached to the trailer underframe wherein the handle and the locking pins are located centrally of the longitudinal extent of the bogie and wherein the locking pins and the locking pin links form a horizontal line in the locked position affording a positive lock and wherein the locking handle engages in an opening in one of the locking pins during the locked position of the bogie to the underframe and, further, wherein the locking handle may be moved to a position more outwardly of the bogie frame and held there for maintaining the bogie in an unlocked position with respect to the trailer undeframe and, further, wherein there is provided a safety pin which locks the handle to the locking pin and provides positive assurance that the locking pin will be retained in the hole of the fixed trailer underframe rail.

10 Claims, 7 Drawing Figures

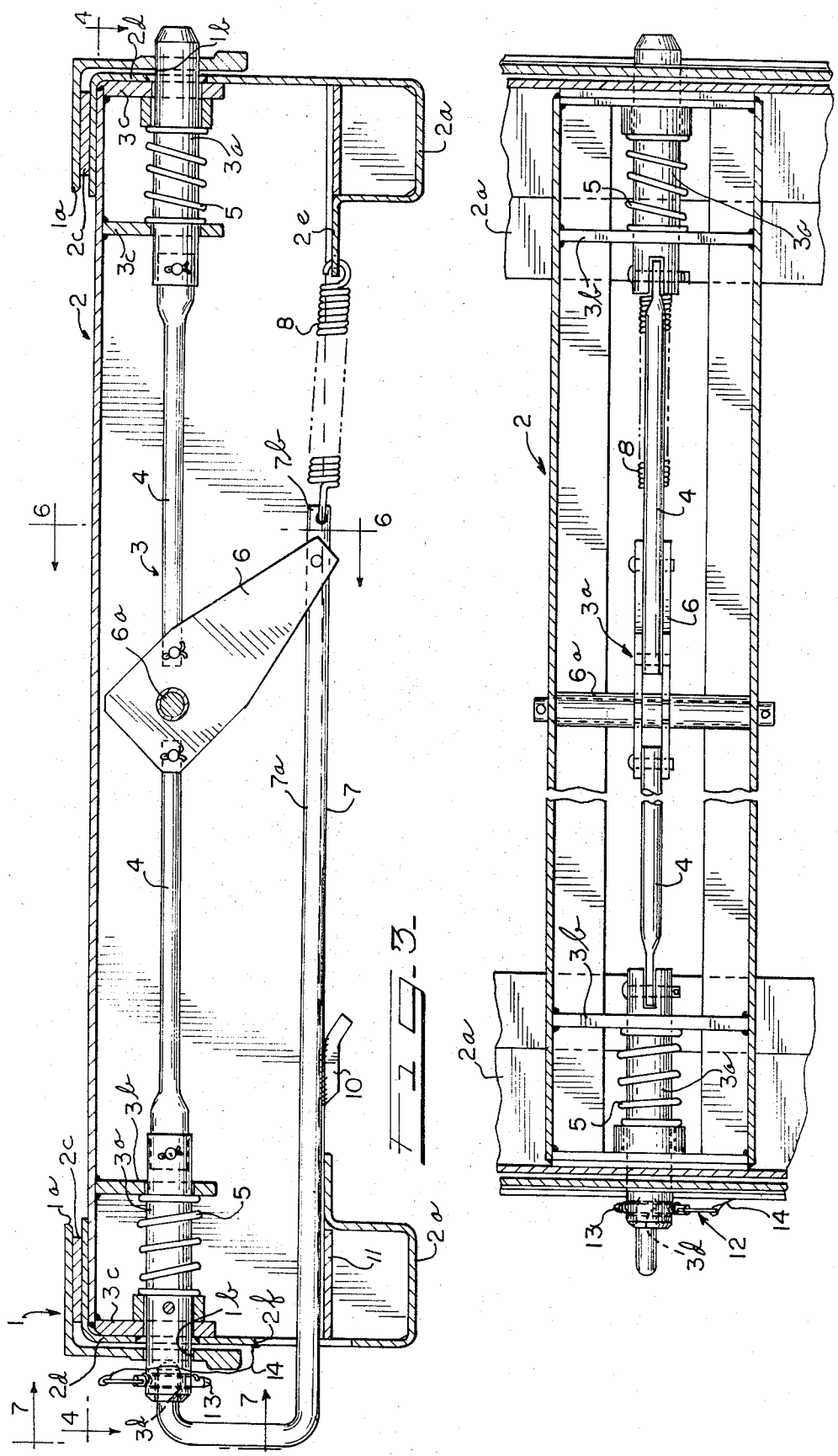

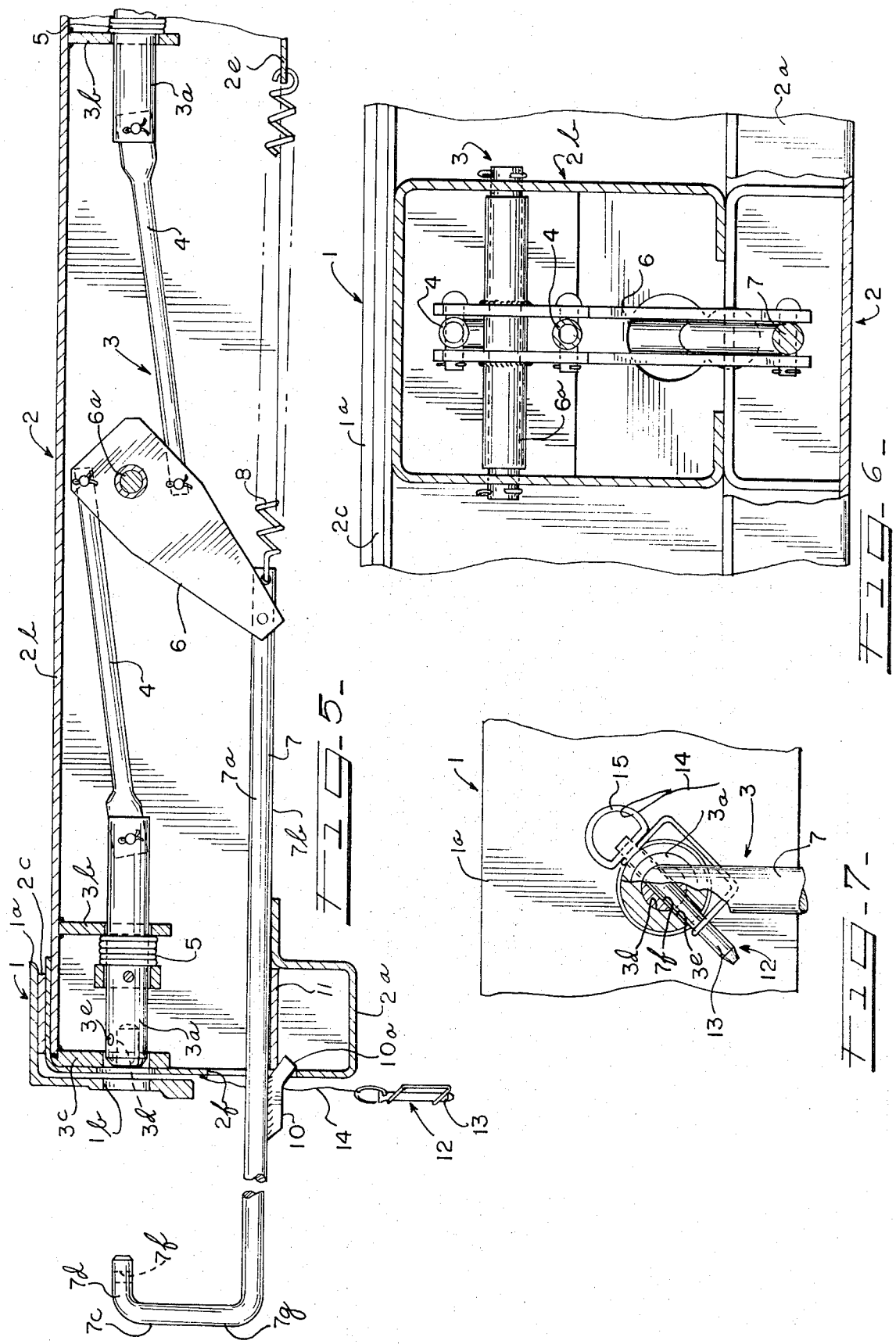

3,778,079

APPARATUS FOR POSITIONING OF VEHICLE SUSPENSION

BACKGROUND OF THE INVENTION

1. Field of the Invention

This invention relates to highway trailers and in particular to highway trailers which are provided with sliding bogies which permit the wheels to be located in varying positions relative to the longitudinal extent of the trailer underframe. In more particular, the invention relates to means for releasably locking the bogie to the underframe and whereby it is visible from the trailer that the bogie is either locked or unlocked with respect to the underframe.

2. Description of the Prior Art

For several years it has been the practice of manufacturers of semitrailers to provide suspension subframe assemblies which can be shifted with respect to the body of the trailer. To prevent movement or shifting of the suspension subframe during "over-the-road" operation, the suspension subframe is locked to a fixed rail by means of removable locking bars or non-removable locking pins. Such an arrangement is shown by U.S. Pat. application Ser.No. 30,739 filed Apr. 22, 1970 and entitled "Apparatus for Positioning Trailer Suspension Frame" and having John J. Glassmeyer as the inventor, now U.S. Pat. No. 3,618,969 issued on Nov. 9, 1971, said patent being hereby incorporated herein by reference.

The advantage of the non-removable or internal locking pins is that they cannot be inadvertently left out of the trailer after the shifting operation, or stolen from the trailer.

As will be shown below, the unique arrangement embodied in this invention takes advantage of the non-removable internal locking pins while affording a compact two pin locking mechanism.

SUMMARY OF THE INVENTION

The locking mechanism has the following advantages:

The locking mechanism is housed completely in the center crossmember affording a compact design.

The locking pins and locking pin links form a horizontal line in the locked position affording a positive lock in that it would require a compression buckling load on the locking pin links to push the locking pins toward the center of the suspension subframe.

The fully locked position is readily known by the engagement of the lock handle in the locking pin hole.

The arrangement of the locking handle in the locking pin affords storage of the locking handle and eliminates vertical and horizontal movement of the handle during "over-the-road" operation.

Due to the locking pins being located at the center of the suspension subframe, the rotational force on the suspension subframe, due to braking, is resisted by the locking pins and the end bearing pads.

The safety pin which locks the handle to the locking pin provides positive assurance that the locking pin will be retained in the hole of the fixed rail of the trailer underframe under all conditions, even in the event of a breakage of part of the locking mechanism.

These and other objects and advantages may be seen by reference to the following description, appended claims and attached drawings.

BRIEF DESCRIPTION OF THE DRAWINGS

FIG. 3 is a transverse view illustrating the locking pins and locking links in the locked position with the handle assembly for fixedly coupling the bogie with respect to the trailer underframe and taken along line 3—3 of FIG. 1 and also incorporating the suspension fixed rails of the trailer underframe;

FIG. 4 is a plan sectional view of the bogie arrangement taken along line 4—4 of FIG. 3;

FIG. 5 is a transverse elevational view similar to FIG. 3 but showing the locking pin and links in the released or unlocked lock position;

FIG. 6 is an enlarged longitudinal sectional view taken generally along line 6—6 of FIG. 3; and FIG. 7 is an enlarged longitudinal sectional view illustrating the pin connection of the handle to the locking pin in the latched or locked position of the locking pin, and taken along line 7—7 of FIG. 3.

DESCRIPTION OF THE PREFERRED EMBODIMENT

Figure 1:
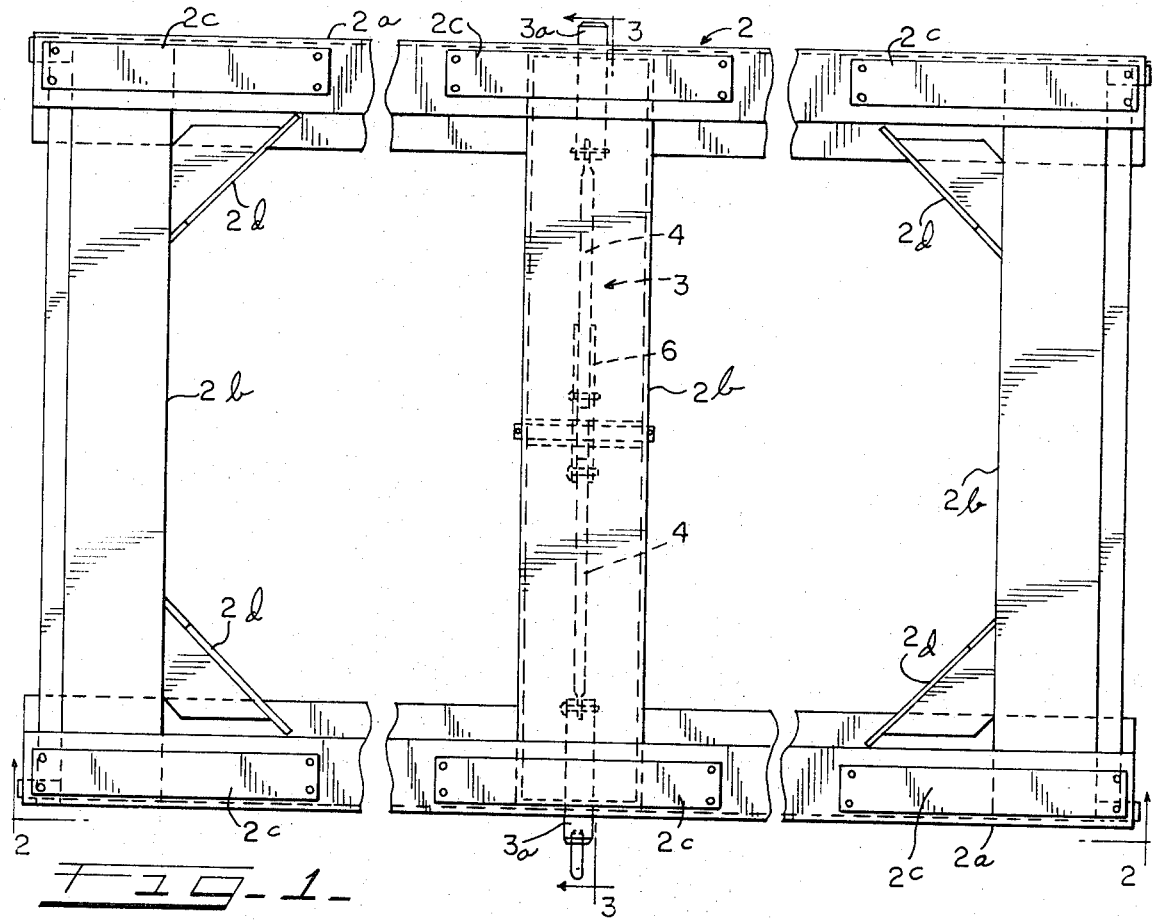
FIG. 1 is a plan view, partially broken, of the bogie arrangement of the trailer.
Figure 2:
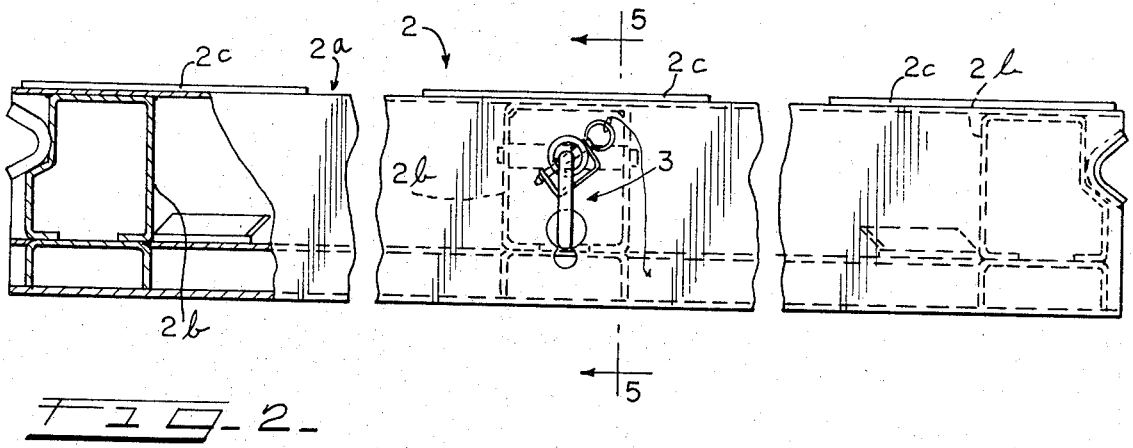
FIG. 2 is a side elevational view of FIG. 1.

With reference now to the drawings and also with reference to the aforesaid U.S. Pat. No. 3,618,969 which has been incorporated herein by reference, there is shown the trailer underframe 1 (partially shown in FIGS. 3 and 5) supported on a bogie assembly or suspension subframe 2. The trailer underframe is provided with suspension fixed rails 1a, as also partially seen in FIGS. 3 and 5, the fixed rails 1a extending longitudinally as side members. The bogie assembly 2 is provided with bogie subframe rails or side frames 2a which are generally G-shaped and is also provided with bogie crossmembers or hat sections 2b. Wear or bearing pads 2c are located at the end and middle of the bogie assembly on each of the bogie subframe rails or side members 2a. A further understanding of this underframe and bogie arrangement may be ascertained by reference to the aforesaid patent.

The bogie assembly 2 is locked to the trailer underframe 1 by the bogie-carrier two-pin locking assembly or mechanism 3. The locking assembly includes a pair of opposed outwardly extending locking pin links pivotally connected on the upper portion of an upstanding lever arm assembly 6 and on opposed sides of the pivot pin connection 6a of the lever arm assembly 6 to the transverse sides of the middle bogie crossmember 2b which houses the locking mechanism 3, as best seen in FIGS. 3 and 5.

The outer ends of the locking pin links 4 are connected to their respective locking pins 3a slidably supported on depending inner brackets 3b extending from the top of the middle bogie crossmember 2b.

Locking pin springs 5 surround their respective locking pins 3a and are entrained between the respective depending inner brackets 3b and the outer downwardly depending side walls 2d of the bogie side rails 2a and the outer brackets 3c depending from the roof of the middle bogie crossmember 2b.

The lower portion of the lever arm assembly 6 is pivotally connected to the lower inwardly extending horizontal rod portion 7a of the handle assembly 7, and the inner free end 7b of the rod 7a connects with the locking handle spring 8 which connects with an inwardly extending horizontal flange 2e of the right bogie subframe rail 2a as viewed in FIGS. 3 and 5. The outer end 7g of the handle rod 7a is U-shaped and provided with a vertically upright portion 7c and an upper inwardly directed horizontal end portion 7d for coupling with the recessed portion 3d of the left hand pin 3a as viewed in FIGS. 3 and 5 in the locked position of the bogie locking assembly 3 as viewed in FIG. 3. FIG. 5 shows the locking handle 7 having its upper inwardly directed free end 7d being outwardly of the bogie assembly and free of connection with the recessed portion 3d of the left hand pin 3a. The unlocked position of the bogie arrangement, as shown in FIG. 5, is maintained by the handle stop 10 on the underside of the rod 7a having its inner downwardly sloping edge portion 10a engaging the side rail plate or stop plate 11 in the lower interior portion of the left bogie subframe rail 2a, the rod 7a and its projection edge 10a being extendable through the opening 2f in the bogie subframe 2a.

In the locked position of the bogie to the underframe, the locking pin 3a on the left side, as viewed in FIG. 3, is coupled with the lock handle by releasable pin means 12 which includes the safety pin 13 held by wire 14 to the outside of the left bogie rail 2a and at the other end is attached to the ring 15 of the safety pin 13 which is extendable conjunctively through the aperture 7f in the handle end portion 7d and the aperture 3e of the pin 3a, see FIGS. 3–5, and 7.

FIG. 3, in illustrating the locked position of the bogie to the underframe, shows the springs 5 and 8 in an extended condition and the lever arm 6 has pivotal connections of the pin links 4 in generally horizontal alignment so that the pin links 4 are also in horizontal positions and in general horizontal alignment with one another and with the pins 3a; whereas in FIG. 5 in the unlocked or released position of the bogie with respect to the underframe the springs 5 and the spring 8 are both under load, the springs 5 being in compression and the spring 8 being in tension whereby the pins 3a are drawn inwardly of the apertures 1b of the side rails 1a of the trailer underframe 1 and the inner end of the left pin link 4 is above the pivot pin 6a and the inner end of the right pin link is below the pivot pin 6a. Thus, the locking pins 3a and the locking pin links 4 form a horizontal line in the locked position affording a positive lock in that it would require a compression buckling load on the locking pin links 4 to push the locking pins 3a toward the center of the suspension subframe 2.

IT is also realized that the fully locked position of the bogie and trailer underframe is readily known by the engagement of the locked handle 7 in the locking pin hole or recess 3d. The arrangement of the locking handle 7 in the locking pin 3a affords storage of the locking handle 7 and eliminates vertical and horizontal movement of the handle during "over-the-road" operation. Since the locking pins 3a are located at the center of the suspension subframe or bogie assembly 2, the rotational force on the suspension subframe, due to braking, is resisted by the locking pins 3a and the end bearing pads 2c. The locking mechanism is housed completely in the center crossmember affording a compact design. The safety pin 13 which locks the handle 7 to the locking pin 3a provides positive assurance that the locking pin will be retained in the hole of the fixed rail of the underframe under all conditions, even in the event of a breakage of a part of the locking mechanism.

To unlock the suspension subframe from the trailer underframe for shifting to a new position of the bogie with respect to the underframe, unlock the suspension subframe rails 2a by pulling the locking handle up (after the safety pin 13 has been removed from the handle and locking pin) to the extreme outer position. This movement rotates the lever arm assembly 6, which pulls the locking pin links 4, which pulls the locking pins 3a inwardly, unlocking the locking pins 3a from the holes 1b in the fixed rails 1a. Next, lock the handle 7 in the outer position by allowing the handle stop 10 to engage the side rail plate 11. Slide the suspension subframe or bogie assembly 2 relative to the trailer underframe 1 to the approximate desired position. Unlock the handle 7 by pulling outward allowing the handle stop 10 to unlock from the side rail plate 11 and then push the handle toward the center of the trailer allowing the handle stop 10 to pass over the side rail plate 11. Next, shift the suspension subframe 2 relative to the trailer underframe 1 allowing the two locking pins 3a to engage the holes 1b in the fixed rails 1a and the locking handle 7 to engage the recessed portion or hole 3d in the left locking pin 3a by the spring action of the locking pin springs 5 and the locking handle spring 8. The suspension subframe is now in the locked position and ready for operation. As a last step, the safety pin 13 is extended through the openings in the end of the handle 7 and in the outer end of the pin 3a and then the pin is snapped closed in safety pin locking fashion.

The foregoing description and drawings merely explain and illustrate the invention and the invention is not limited thereto, except insofar as the the appended claims are so limited, as those skilled in the art who have the disclosure before them will be able to make modifications and variations therein without departing from the scope of the invention.

What is claimed is:

1. A roadway vehicle apparatus comprising:
   a trailer underframe,
   a bogie unit movably mounted with respect to the trailer underframe,
   a locking assembly mounted on the bogie unit and selectively locking the bogie unit to the trailer underframe at selected positions of the bogie unit along the underframe,
   said locking assembly including a locking pin extendable through the bogie unit and the trailer underframe from an unlocked position within the bogie unit and the underframe to a locked position extending through both the underframe and the bogie unit,
   means connected to the locking pin for reciprocally moving same between the locked and unlocked positions, including an operable handle for positionably controlling the locking pin, and
   said handle having a portion thereof which moves toward the locking pin as it is moved toward the locked position and into engagement with the locking pin in the locked position as an indication that the locked position has been assumed.

2. The invention according to claim 1, and
   said bogie unit having a center crossmember, and
   said locking assembly being housed completely within the center crossmember.

3. The invention according to claim 1, and safety pin means for retaining said handle portion and said locking pin in engagement in the locked position.

4. The invention according to claim 1, and said means connected to the locking pin for reciprocally moving same including a lever pivotally mounted on the bogie unit and positionably controlled by the handle to thereby position the locking pin, and biasing means connecting with the lever in opposition to the handle for urging the lever such that the locking pin and handle tend toward the locked position.

5. The invention according to claim 1, and said locking pin including means defining a handle portion receiving aperture therein for accommodating said handle portion in the locked position.

6. The invention according to claim 5, and means defining a safety pin receiving aperture in said locking pin which communicates with said handle portion receiving aperture, means defining a safety pin receiving aperture in said handle portion in alignment with the safety pin receiving aperture in said locking pin in the locked position, and a safety pin disposed in said safety pin receiving apertures to retain the handle portion and locking pin in place in the locked position.

7. A roadway vehicle apparatus comprising:

a trailer underframe, a bogie unit slidably mounted with respect to the trailer underframe, a locking assembly mounted on the bogie unit and selectively locking the bogie unit to the trailer underframe at selected positions of the bogie unit along the underframe, handle means for reciprocally moving the locking assembly between locked and unlocked positions of the bogie unit and underframe, said assembly including opposed locking pins extendable through the bogie unit and the trailer underframe from the unlocked position within the bogie unit and underframe to the locked position extending through both the underframe and the bogie unit, one of the locking pins having handle receiving means and said handle means including pin receiving means whereby the handle receiving means and the pin receiving means are coupled with one another when the handle means is in the locked position for fixedly coupling the trailer underframe and the bogie unit together.

8. The invention according to claim 7 and said handle receiving means including an aperture in said one pin and said pin receiving means including an end portion of the handle means.

9. A roadway vehicle apparatus comprising:

a trailer underframe, a bogie unit movably mounted with respect to the trailer underframe, a locking assembly mounted on the bogie unit and selectively locking the bogie unit to the trailer underframe at selected positions of the bogie unit along the underframe, said locking assembly including opposed locking pin means extendable through the opposed sides of the bogie unit and trailer underframe and including a pair of opposed links, each link pivotally connected to a respective locking pin means, said locking assembly further including a lever having pivot means mounted on the bogie unit with the links connecting with the lever on opposite sides of the pivot means, each of said locking pin links lying in horizontal alignment with one another and with each of the locking pin means, said locking means and said locking pin links forming a horizontal line in the locked position of the locking pin means affording a positive lock, handle means connected to said lever for rotating same about said pivot means to thereby reciprocally move the respective locking pin means between locked and unlocked positions, and said handle means having a portion thereof which moves toward one of the locking pin means as said one locking pin means is moved toward the locked position and into engagement with said one locking pin means in the locked position as an indication that the locked position has been assumed.

10. A roadway vehicle apparatus comprising:

a trailer underframe including a pair of laterally spaced longitudinally extending rails, said rails having longitudinally spaced transversely aligned holes, a sliding bogie unit including a bogie subframe having a pair of laterally spaced longitudinally extending rail means slidably mounted with said rails, a locking assembly mounted on said bogie unit and including a pair of transversely extending opposing locking pin means on each side of the bogie unit and selectively engageable with one of the holes in each of said rails, biasing means urging each of said opposed locking pin means into its respective rail hole, handle means for transversely reciprocating each of said locking pin means in and out of a respective of said rail holes, said locking assembly including a pivotally mounted lever having pivot means therefor and a pair of pin links pivotally connected to the lever on opposite sides of said lever pivot means and each pin link pivotally connecting with a respective locking pin means, said handle means including a handle rod pivotally connected to the lever below the pivot means and the pin links and having spring means urging the lever and locking pin means thereby to the locking position, said bogie subframe having a stop member, said handle rod having a bent end portion coupling with one of the locking pin means in the locked position of the locking pin means and said rod including a stop engagable with the stop member on the bogie subframe for extending the handle rod outwardly of the bogie unit in opposition to the handle spring means and the biasing means for the locking pin means and thereby disengaging the end of the rod from its locking pin means and causing both locking pin means to move inward for releasing of the trailer frame with respect in the bogie subframe.

* * * * *